Jan. 4, 1938.  H. MUTH  2,104,569
VARIABLE MECHANICAL MEANS FOR AN OSCILLATION CIRCUIT
Filed Nov. 21, 1934
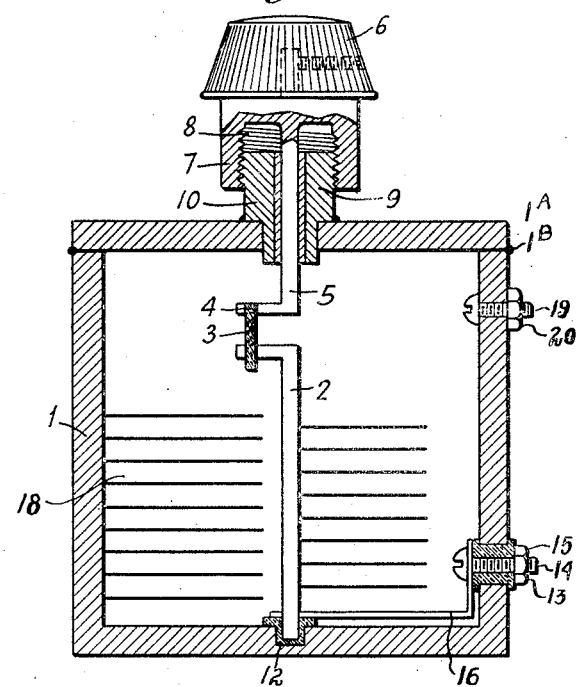
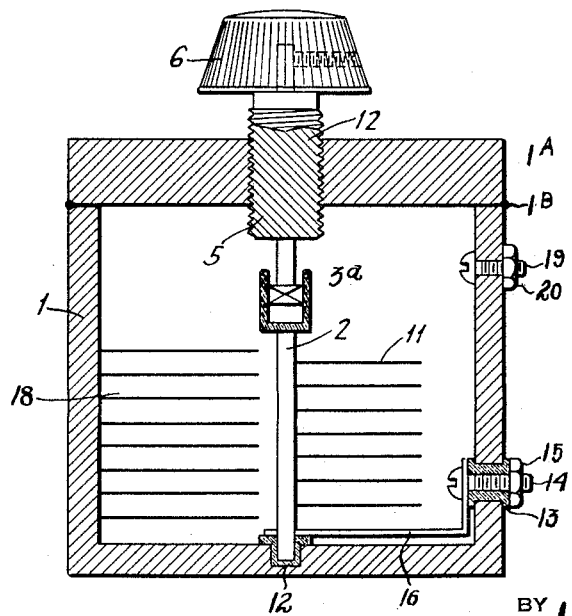
INVENTOR
HERBERT MUTH
BY
ATTORNEY Patented Jan. 4, 1938

2,104,569

UNITED STATES PATENT OFFICE 2,104,569

VARIABLE MECHANICAL MEANS FOR AN OSCILLATION CIRCUIT

Herbert Muth, Berlin, Germany, assignor to Telefunken Gesellschaft für Drahtlose Telegraphie m. b. H., Berlin, Germany, a corporation of Germany Application November 21, 1934, Serial No. 754,187
In Germany November 9, 1933

3 Claims. (Cl. 175—41.5)

This invention relates to an improved hermetically closed oscillation circuit or oscillation circuit element whose reactances (coils, capacities, or both) are regulable from the outside by a rotor spindle.

In many cases it is necessary to so build oscillation circuits so that they become independent of the fluctuations of atmospheric pressure and atmospheric humidity. The safest means to that end probably would consist in an oil seal. However, this inheres the drawback that the device cannot be mounted in any desired position, not to mention the fact that the oil is likely to occasion the introduction of impurities or dirt in the device.

Now, the invention is based upon the proper appreciation of the fact that an adequately hermetic closure is insurable even by passing the control spindle through the wall in the form of a worm or screw union.

Two exemplified embodiments of the construction of this invention are diagrammatically illustrated in the drawing, in which Fig. 1 is a sectional view of a variable condenser having an operating spindle connected to the control knob by a crank arrangement, and Fig. 2 is a sectional view of a variable condenser having the operating spindle rotating by threaded means in the wall of the container.

Referring to Fig. 1, there is shown a metallic vessel 1, which may be provided with a cover 1A soldered or welded at 1B in any suitable manner to form a hermetically sealed container for enclosing the apparatus to be adjusted, inside which container 1 is accommodated some suitable regulable or adjustable element comprised in the oscillation circuit, for instance, a rotor 11 seated on the spindle 2 of a rotary condenser. This spindle is connected by way of a crank arrangement 3, 4, with the control or regulating spindle 5 brought into the container from the outside. The control knob 6 of the said spindle is fixedly connected with a bush 7 which interiorly is provided with a screw thread 8 and which therefore is capable of rotation upon a bush 9 secured on the container and having a matching male screw thread. The bush 9 is hermetically united with the vessel 1 by means of a soldered joint.

The rotor plates are insulated from the casing by member 3 being of insulating material, also by the insulated bearing bushing 12 and casing bushing 13. External connections are made by screws 14, nut 15 and lead 16. The stator plates 18 are connected directly to the casing 1, and external connections are made by screw 19 and nut 20.

In the exemplified embodiment shown in Fig. 2 it is the control shaft 5 which is furnished with a screw-thread 12. Also in this case, as in the previous embodiment, casing 1 is formed in two parts and welded together, the rotor plates are insulated by member 3A and bushings 12 and 13, the twisting of the control spindle 5 occasions rotation of the rotor spindle 2. The female screw thread in this instance is provided in the wall of vessel 1. Tests have shown that such form of packing represents a sufficiently hermetic seal and closure for all practical purposes.

I claim:

1. A variable condenser whose capacity is varied from the outside comprising a metallic casing, fixed and movable electrode members within said casing, a shaft secured to said movable electrode members, a shaft passing through an external bushing on said casing, a crank arrangement within said casing and coupled between said first and second mentioned shafts, an operating knob secured to said second shaft, said external bushing having a screw thread located thereon, said operating knob having a depending threaded member cooperating with the thread on said external bushing for rotating said movable electrode members with respect to said fixed electrode members.

2. A hermetically sealed variable condenser whose capacity is varied from the outside comprising a hermetically sealed casing, fixed and movable electrode members within said casing, a shaft secured to said movable electrode members, a shaft passing through an external bushing on said casing, a crank arrangement within said casing and coupled between said first and second mentioned shafts, an operating knob secured to said second shaft, said external bushing having a screw thread located thereon and being in the same plane as said first and second shafts, said operating knob having a depending threaded member cooperating with the thread on said external bushing for rotating said movable electrode members with respect to said fixed electrode members.

3. A hermetically sealed variable condenser element whose capacity is varied from the outside comprising a hermetically sealed casing, fixed and movable electrode members within said casing, a shaft secured to said movable electrode members, a second shaft passing through said casing, a crank arranged within said casing and coupled between said first and second mentioned shafts, an external threaded stud secured to said hermetically sealed casing, and an operating knob secured to said second shaft, said operating knob having a screw threaded portion cooperating with said threaded stud for rotating said movable electrode members with respect to said fixed electrode members.

HERBERT MUTH.